March 11, 1930.                    P. KLEIN                    1,750,177
        PROCESS FOR THE IMMEDIATE PRODUCTION OF MECHANICALLY
              UNWORKED PURE RUBBER SHEETS FROM LATEX
                    Original Filed Jan. 26, 1924

Paul Klein
Inventor by Steward & McKay
his attorneys

Patented Mar. 11, 1930

1,750,177

UNITED STATES PATENT OFFICE

PAUL KLEIN, OF BUDAPEST, HUNGARY, ASSIGNOR, BY MESNE ASSIGNMENTS, TO AMERICAN ANODE, INC., A CORPORATION OF DELAWARE

PROCESS FOR THE IMMEDIATE PRODUCTION OF MECHANICALLY-UNWORKED PURE RUBBER SHEETS FROM LATEX

Application filed January 26, 1924, Serial No. 688,777, and in Hungary October 11, 1923. Renewed October 6, 1927.

The present invention relates to a process and apparatus for the immediate production of mechanically unworked pure rubber sheets from latex.

The preparation of crude rubber is at present effected by coagulating latex. When it is desired to produce technically pure rubber, the product obtained by coagulation, is washed and rolled by means of roller mills, masticators and the like.

In this procedure however, the product is very irregular and its quality depends on whether the washing has been effected more or less thoroughly, whether the rubber has been exposed to a greater or lesser extent to the disintegrating pressure of the rollers, and whether it more or less retains its original colloidal structure. In any case, the nerve of the crude rubber is weakened by this method of preparation.

A further disadvantage of the method hitherto in use is that the impurities contained in the latex of certain caoutchouc-yielding plants make it often uneconomical to exploit these plants.

The divergent quality of the crude rubber obtained by the same treatment from the same plants and the same districts, sometimes causes working difficulties of the most disagreeable kind, and both practical and scientific workers are constantly engaged in solving the problem how to obtain uniform products in which also the original colloidal structure, that is the nerve of the rubber, remains unhurt. The Hopkinson process aims at serving this purpose, the transforamtion of the latex into crude rubber being effected not by chemical coagulation, but in such a manner that the latex is atomized in warm air, and is thereby dried, and is then shaped into blocks by pressing. This process preserves the nerve, but, unless the latex has already been purified, the product is not free from impurities, and must subsequently be again subjected to the detrimental washing process.

Attempts have also been made to obtain pure coagulated rubber by coagulating latex in a centrifugal apparatus, the centrifugal action also purifying the rubber at the same time. This intermittent method of working however, is uneconomical in practice.

On the other hand attempts have been made to precipitate rubber from latex by the action of an electric current. However, this method produces a crude rubber which has to be subsequently submitted to the washing process.

In contradistinction to these known processes, the present invention relates to a process for the immediate production of perfectly pure crude rubber sheets from rubber latex without previous mechanical working of the coagulated rubber (which would interfere with the nerve of the rubber), whilst completely retaining the original colloidal structure of the same, that is to say in such a manner that the entire rubber contents of the latex, and even the latices of inferior grades of rubber, can be worked up to first class, perfectly pure rubber sheets without practically leaving any residue.

According to the new process the latex is freed from impurities and if desired from a great part of its serum, for example, by centrifuging in skimming centrifugal machines, i. e. centrifuges which allow the latex of highest concentration to be continuously removed during the centrifuging, and thereupon the rubber is precipitated from the purified latex on a supporting surface having anodic properties, in the form of a coherent crepe sheet, and detached from said base after removal from the bath.

Preferably a preservative agent which impedes coagulation, for example about 0.5% of ammonia, may be added to the latex prior to centrifuging, or prior to electrophoresis.

It is true that it is known to precipitate rubber from latex, by electricity, in a coagulated state. However, the precipitates obtained in this manner from the original latex contain also the impurities and the resinous constituents of the latex in full degree, because they also exhibit a negative charge, and migrate during electrophoresis in the same direction as the rubber globuloids. Consequently, these precipitates or sheets are not pure, and for the purpose of purification must be washed, that is to say they have to be submitted to that mechanical treatment and mastication which according to the invention is just what is to be avoided.

According to the present process the latex is intended to be purified for example by centrifuging and concentrating prior to electrophoresis.

Attempts have already been made to concentrate latex by centrifuging. However, these attempts as can be seen from the article published by the Firm of Henderson in the journal "India-Rubber World", the issue of 1st August, 1923, have entirely failed. Either the centrifugal apparatus becomes choked, or only a small part of the rubber contained in the latex is transformed into a slightly higher concentration as compared with the original latex; whereas the bulk of the rubber content remains in the more dilute, and comparatively more impure part, which on coagulation, yields rubber of inferior quality.

Experiments have now shown however, that it is possible, when using a centrifugal apparatus of the kind described driven at suitable speed, and by a suitable selection of the thickness of the concentrated layer removed, to transform practically the whole rubber content of the latex into a concentrate containing up to 60% of dry rubber of the highest purity. If the centrifugal apparatus is driven at a speed at which the concentration of the rubber in the stratum of lowest specific gravity of the latex contained in the centrifugal apparatus approaches as near as possible (without exceeding) the limit of stability necessary to ensure prevention of coagulation, and if at the same time the thickness of the skimmed concentrated layer is so calculated that the average concentration of said skimmed layer (the concentration of which as is well known decreases from the axis towards the perimeter of the centrifuge) deviates only slightly from the maximum concentration of same, and the diluted effluent from the centrifugal apparatus is treated in the same way, it is possible in practice by repeating the centrifugal action merely three times, to transform the entire rubber contents of the latex, into a stable concentrate containing about 50–60% dry rubber and technically free from impurities.

It has further been found that, in this kind of concentration and purification of the latex, the transparent dyeing of the rubber can be most advantageously carried out. For this purpose the latex is treated with organic dyes, the ultra-microns of which, when in the state of hydrosol, exhibit a negative charge. Such dyes are adsorbed by the rubber particles without causing coagulation, and enter the concentrate, whereas the unadsorbed parts of the dye remain in the serum or are deposited in the sediment.

From this purified, and if desired also coloured rubber latex, the rubber is precipitated, by electrophoresis, upon a base having anodic properties. In the electrophoretic precipitation of rubber the dye adsorbed by the rubber particles enters, with the rubber, into the precipitated rubber sheet, and yields a completely uniform transparently coloured rubber. In the same way as these dyes, a series of the known additional agents also may be incorporated with the latex after they have been brought into the colloidal state. In using additional agents, the ultramicrons of which in aqueous dispersion possess a negative charge, cataphoretic precipitation produces a homogeneous rubber mixing.

For producing a continuous band or sheet, an endless base is used such as a drum or an endless band, which is continuously passed through the latex. The rubber sheet precipitated by electrophoresis can be detached, as a coherent band, from that part of the movable anodic base which protrudes from the latex.

In the drawings are diagrammatically shown several embodiments of suitable devices for the immediate production of crepe sheets from purified or if desired also concentrated latex, which if desired is coloured or incorporated with additional materials.

Figure 1:
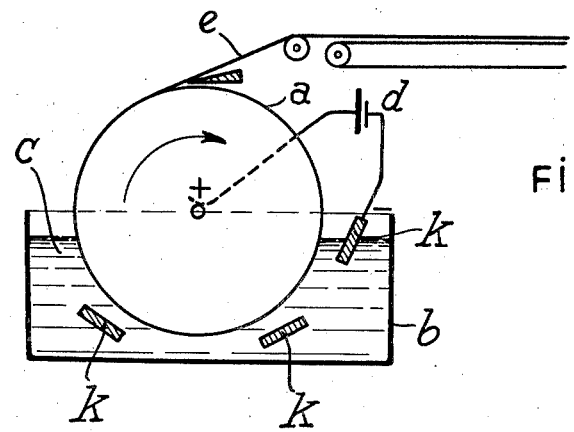
Fig. 1 is a diagrammatic longitudinal section of a device with a drum.

According to Fig. 1 the purified concentrated latex $c$ is placed in the receptacle $b$ in which the revolvable metal drum $a$ is inserted. The drum $a$ is connected to the positive pole of the source of current $d$ and forms the anode. $k$ are the carbon cathodes connected to the negative pole of the source of current. The drum $a$ is revolved in the direction of the arrow. Owing to the cataphoretic action of the electric field, the caoutchouc particles migrate towards the anode $a$ on which, by reason of the acid ions and oxygen bubbles liberated there, the rubber is precipitated as a spongy but coherent deposit. From that part of the drum which emerges from the bath the deposited rubber layer is detached in the form of a continuous band-like spongy sheet $e$, which can be easily freed from the adherent, non-coagulated latex and dried. The resulting crepe sheet is perfectly pure and forms, when dried, a first-class marketable article, without further working, the colloidal original structure not having been interfered with by any treatment. The caoutchouc contents of the latex can be entirely recovered by cataphoresis without impairing the quality of the product. However, inasmuch as the velocity of separation decreases with the decreasing concentration, the weakened bath may preferably be enriched again by centrifuging or electroosmosis, or in any other way.

As material for the anode a conductor should be used which will only be corroded to a minimum extent by the liberated oxygen and acid ions, for instance, amalgamated zinc.

Figure 2:
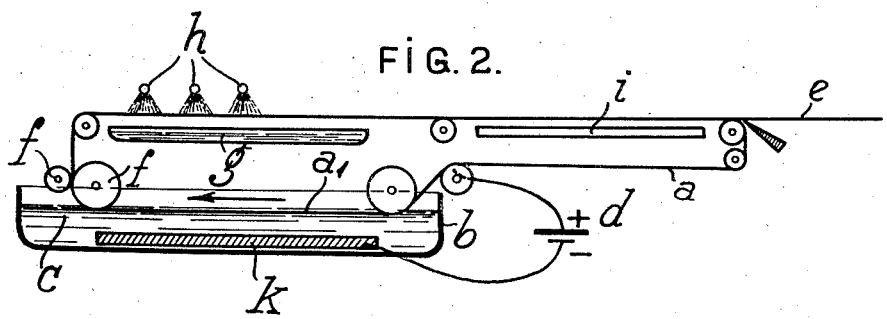
Fig. 2 is a longitudinal section of a device with an endless band.

According to Fig. 2 an endless metal band or metal fabric $a$ serves as anode, and is led in such a way over rollers as to form a horizontal track $a'$ which is as long as possible and situated near the surface of the bath below which track the cathode $k$ is situated on the bottom of the receptacle $b$. On issuing from the bath the excess latex is squeezed out of the rubber precipitate on the band between the rollers $f, f$, whereupon the band is passed over a collecting receptacle $g$ and is rinsed and washed by means of nozzles $h$, and thereupon dried over a drying table $i$. The dried sheet is detached from the band $a$ and rolled or folded. The precipitation of the rubber crepe can be effected on one side upon the band $a$. However, the device may also be suitably constructed in such a way that cathodes are provided on both sides of the band $a$ and that the rubber precipitate is formed on both sides of the band.

Figure 3:
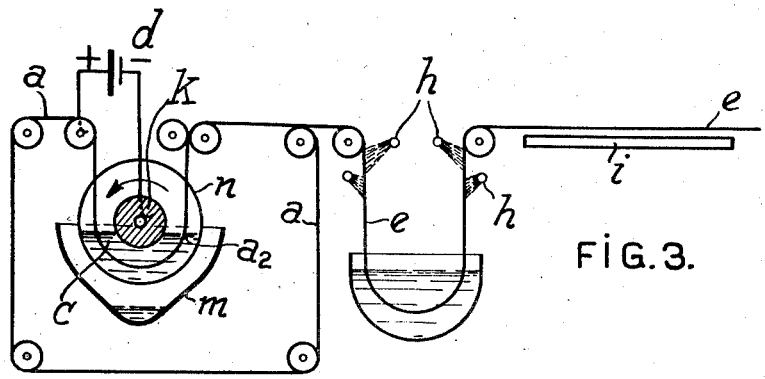
Fig. 3 is a longitudinal section of a device with an endless band, in which this latter simultaneously forms the receptacle for receiving the latex.

Fig. 3 finally shows an arrangement in which the band $a$ forms a trough-like loop $a^2$ into which the concentrated latex is filled. In the trough $a^2$ there is also a cylindrical, turned cathode $k$, at both end faces of which are provided plates $n$ consisting of a nonconductor, especially rubber, which fit as tightly as possible against the trough $a^2$ and close same. Any latex which, nevertheless, escapes is collected in a trough $m$. The term rubber is understood to include any similar substances, such as guttapercha, balata, and the like.

I claim:

1. A process of the kind described which consists in adding to the latex organic dyes, the ultramicrons of which exhibit a negative charge in the state of hydrosol and extracting by centrifuging from the latex the excess of dye not having been adsorbed by the rubber particles.

2. A process of the kind described which consists in adding to the latex organic dyes, the ultramicrons of which exhibit a negative charge in the state of hydrosol and extracting, by centrifuging from the latex the excess of dye not having been adsorbed by the rubber particles and thereupon precipitating the rubber from said purified latex by electrophoresis upon a supporting surface having anodic properties.

3. A process of the kind described which consists in adding to the latex organic dyes, the ultramicrons of which exhibit a negative charge in the state of hydrosol and extracting by centrifuging from the latex the excess of dye not having been adsorbed by the rubber particles, and thereupon precipitating the rubber from said purified latex by electrophoresis upon an endless supporting surface having anodic properties and continually travelling through the latex, and detaching the rubber sheet from that part of said supporting surface.

4. The process for the production of mechanically unworked pure rubber directly from latex which comprises removing from natural latex a portion of its serum constituent and thereafter precipitating the rubber from said treated latex by electrophoresis upon a supporting surface having anodic properties.

5. The process for the production of mechanically unworked pure rubber directly from latex which comprises freeing latex from impurities by centrifuging in centrifugal apparatus and thereafter precipitating the rubber from said purified latex by electrophoresis upon a supporting surface having anodic properties.

6. The process for the production of mechanically unworked pure rubber sheets from latex which comprises removing from natural latex a portion of its serum constituent and thereafter precipitating the rubber from said treated latex by electrophoresis upon an endless supporting surface having anodic properties and continually traveling through the latex, and detaching the rubber sheet from that part of said supporting surface which emerges from the latex.

7. The process for the production of mechanically unworked pure rubber sheets from latex which comprises freeing latex from impurities by centrifuging in centrifugal apparatus, and thereafter precipitating the rubber from said purified latex by electrophoresis upon an endless supporting surface having anodic properties and continually traveling through the latex, and detaching the rubber sheet from that part of said supporting surface which emerges from the latex.

8. The process for the production of mechanically unworked pure rubber sheets from latex which comprises freeing latex from impurities by centrifuging in centrifugal apparatus, and thereafter precipitating the rubber from said purified latex by electrophoresis upon a drum having anodic properties and continually traveling through the latex, and detaching the rubber sheet from that part of said drum which emerges from the latex.

9. The process for the production of mechanically unworked pure rubber sheets from latex which comprises freeing latex from impurities by centrifuging in centrifugal apparatus, and precipitating the rubber from said purified latex by electrophoresis upon an endless band having anodic properties and continually traveling through the latex, and detaching the rubber sheet from that part of said band which emerges from the latex.

10. The process for the production of mechanically unworked pure rubber sheets from latex which comprises removing from natural latex a portion of its serum content together with impurities carried thereby, and precipitating the rubber from said treated latex by electrophoresis upon a drum having anodic properties and continually traveling through the latex, and detaching the rubber sheet from that part of said drum which emerges from the latex.

11. The process for the production of mechanically unworked pure rubber sheets from latex which comprises adding an agent impeding coagulation to the latex and centrifuging the thus treated latex in a skimming centrifugal apparatus driven at a speed at which the concentration of the latex in the stratum of the lowest specific gravity of the latex contained in the centrifuging apparatus approaches as near as possible (but without exceeding) the limit of stability necessary to ensure the prevention of coagulation, and maintaining simultaneously the thickness of the skimmed concentrated layer so low, that the average concentration of said skimmed layer deviates as slightly as possible from the maximum concentration of same and precipitating the rubber from said purified latex by electrophoresis upon a supporting surface having anodic properties.

12. The process for the production of mechanically unworked pure rubber sheets from latex which comprises adding an agent impeding coagulation to the latex and centrifuging the thus treated latex in a skimming centrifugal apparatus driven at a speed at which the concentration of the latex in the stratum of the lowest specific gravity of the latex contained in the centrifuging apparatus approaches as near as possible (but without exceeding) the limit of stability necessary to ensure the prevention of coagulation, and maintaining simultaneously the thickness of the skimmed concentrated layer so low, that the average concentration of said skimmed layer deviates as slightly as possible from the maximum concentration of same, and precipitating the rubber from said purified latex by electrophoresis upon an endless supporting surface having anodic properties and continually traveling through the latex, and detaching the rubber sheet from that part of said supporting surface which emerges from the latex.

13. The process for the production of mechanically unworked pure rubber sheets from latex which comprises adding an agent impeding coagulation to the latex and centrifuging the thus treated latex in a skimming centrifugal apparatus driven at a speed at which the concentration of the latex in the stratum of the lowest specific gravity of the latex contained in the centrifuging apparatus approaches as near as possible (but without exceeding) the limit of stability necessary to ensure the prevention of coagulation, and maintaining simultaneously the thickness of the skimmed concentrated layer so low, that the average concentration of said skimmed layer deviates as slightly as possible from the maximum concentration of same, and subjecting the dilute effluent to the same treatment until practically the whole rubber contents of the latex have been transformed into a concentrate containing above 50–60% dry rubber, and substantially free from impurities, and precipitating the rubber from said purified latex by electrophoresis upon a supporting surface having anodic properties.

14. A process of the kind described which consists in adding to the latex additional substances to be incorporated in the rubber in the colloidal state and extracting by centrifuging from the latex the excess of the additional matters not having been adsorbed by the rubber particles.

15. A process of the kind described which comprises adding to the latex additional substances to be incorporated in the rubber in the colloidal state, and extracting by centrifuging from the latex the excess of the additional matters not having been adsorbed by the rubber particles, and precipitating the rubber from said purified latex by electrophoresis upon a supporting surface having anodic properties.

16. A process of the kind described which comprises adding to the latex additional substances to be incorporated in the rubber in the colloidal state, and extracting by centrifuging from the latex the excess of the additional matters not having been adsorbed by the rubber particles and precipitating the rubber from said purified latex by electrophoresis upon an endless supporting surface having anodic properties and continually traveling through the latex and detaching the rubber sheet from that part of said supporting surface.

17. A process of the kind described comprising adding to latex additional substances to be incorporated in the rubber in the colloidal state, and thereafter removing by centrifuging from the latex at least a part of the excess of such additional substances as have not been absorbed by the rubber particles of the latex.

18. A process of the kind described comprising adding to latex additional substances to be incorporated in the rubber in the colloidal state, removing by centrifuging from the latex at least a part of the excess of such additional substances as have not been absorbed by the rubber particles of the latex, and thereafter separating the rubber particles from the serum to form a solid rubber product.

19. A process of the kind described comprising adding to latex a dye capable of being absorbed by the rubber particles of the latex, and thereafter removing by centrifuging from the latex at least a part of the excess of such dye not absorbed by the rubber particles.

20. A process of the kind described comprising adding to latex a dye capable of being absorbed by the rubber particles of the latex, removing by centrifuging from the latex at least a part of the excess of such dye not absorbed by the rubber particles, and thereafter separating the rubber particles from the serum to form a colored rubber product.

21. The process for the production of rubber directly from latex which comprises adding to the latex an agent impeding coagulation, removing from the treated latex a portion of its serum constituents, and thereafter depositing rubber from the latex upon a supporting surface having anodic properties.

22. The process for the production of rubber directly from latex which comprises adding to the latex an agent impeding coagulation, removing liquids from the treated latex to a point where the rubber content is of the order of 50 to 60% by weight, and thereafter depositing rubber from the latex upon a supporting surface having anodic properties.

23. The process for the production of rubber directly from latex which comprises adding to the latex additional substances to be incorporated in the rubber in the colloidal state, removing liquids from the treated latex to a point where the rubber content is of the order of 50 to 60% by weight, and thereafter depositing rubber from the latex upon a supporting surface having anodic properties.

In testimony whereof I affix my signature.

Dr. PAUL KLEIN.